(12) United States Patent
Sonnervig et al.

(10) Patent No.: US 9,528,697 B2
(45) Date of Patent: *Dec. 27, 2016

(54) ENERGY ACCUMULATION AND DISTRIBUTION

(71) Applicant: ABB Schweiz AG, Baden (CH)

(72) Inventors: Björn Sonnervig, Brattholmen (NO); Sven Sonnervig, Knarrevik (NO); Kim Kristensen, Flekkefjord (NO)

(73) Assignee: ABB Schweiz AG, Baden (CH)

(*) Notice: Subject to any disclaimer, the term of this patent is extended or adjusted under 35 U.S.C. 154(b) by 0 days.

This patent is subject to a terminal disclaimer.

(21) Appl. No.: 14/888,760

(22) PCT Filed: May 5, 2014

(86) PCT No.: PCT/EP2014/059113
§ 371 (c)(1),
(2) Date: Nov. 3, 2015

(87) PCT Pub. No.: WO2014/180785
PCT Pub. Date: Nov. 13, 2014

(65) Prior Publication Data
US 2016/0084494 A1    Mar. 24, 2016

(30) Foreign Application Priority Data
May 6, 2013    (EP) .................................... 13166597

(51) Int. Cl.
*F24C 1/00* (2006.01)
*A47J 27/00* (2006.01)
(Continued)

(52) U.S. Cl.
CPC *F22B 1/00* (2013.01); *H02J 15/00* (2013.01)

(58) Field of Classification Search
None
See application file for complete search history.

(56) References Cited

U.S. PATENT DOCUMENTS 2,755,898 A * 7/1956 Bell ..................... F16D 61/00
                                                   138/30
4,132,283 A * 1/1979 McCurry ................ B60K 6/12
                                                   180/165

(Continued)

FOREIGN PATENT DOCUMENTS

EP      2802060 A1    11/2014
WO  2011148050 A2    12/2011

OTHER PUBLICATIONS

European Search Report Application No. EP 13 16 6597 Completed: Sep. 16, 2013; Mailing Date: Sep. 24, 2013 9 pages.

(Continued)

*Primary Examiner* — Thor Campbell
(74) *Attorney, Agent, or Firm* — Whitmyer IP Group LLC (57) ABSTRACT

An energy accumulation, a distribution system and an energy accumulator that accumulates waste energy. A first energy interface is adapted for receiving first waste energy to be accumulated from a braking power reserve. A second energy interface is adapted for receiving second waste energy to be accumulated from a power generation reserve. An energy store is adapted for accumulating said received first and second waste energy. A third energy interface is adapted for providing the accumulated waste energy to at least one of an auxiliary energy exchanger and a main steam line so as to distribute the accumulated energy. A corresponding method, computer program, and computer program product and are also provided.

15 Claims, 3 Drawing Sheets

(51) Int. Cl.
*H02J 15/00* (2006.01)
*F22B 1/00* (2006.01)

(56) References Cited

U.S. PATENT DOCUMENTS

| | | | | |
|---|---|---|---|---|
| 4,470,476 A * | 9/1984 | Hunt | ............ | B60K 6/26 180/65.25 |
| 5,549,174 A * | 8/1996 | Reis | ............ | B60K 6/12 180/165 |
| 7,056,251 B2 * | 6/2006 | Ibaraki | ............ | B60K 6/44 180/304 |
| 8,087,733 B2 * | 1/2012 | Fouquet | ............ | B60K 6/12 303/10 |
| 8,166,753 B2 * | 5/2012 | Rose | ............ | B60K 6/12 60/413 |
| 8,186,155 B2 * | 5/2012 | Rose | ............ | B60K 6/12 60/414 |
| 8,302,720 B2 * | 11/2012 | Rose | ............ | B60K 6/12 180/167 |
| 8,499,875 B2 * | 8/2013 | Rose | ............ | B60K 6/12 123/179.31 |
| 8,840,524 B2 * | 9/2014 | Arsenault | ............ | B60W 10/06 477/5 |
| 2006/0225421 A1 * | 10/2006 | Yamanaka | ............ | F02G 5/00 60/645 |
| 2010/0133031 A1 | 6/2010 | Mendler | | |
| 2012/0306201 A1 * | 12/2012 | Sorensen | ............ | F03B 11/00 290/7 |

OTHER PUBLICATIONS

International Preliminary Report on Patentability Application No. PCT/EP2014/059113 Completed: Sep. 7, 2015 pages.
International Search Report and Written Opinion of the International Searching Authority Application No. PCT/EP2014/059113 Completed: Aug. 11, 2014; Mailing Date Aug. 20, 2014 12 pages.
Vacon, "Break resistors", users manual, Oct. 1, 2010, pp. 1-36, XP007922236, Vacon distributor, Finland.
Written Opinion of the International Preliminary Examining Authority Application No. PCT/EP2014/059113 Mailing Date: Apr. 7, 2015 5 pages.

* cited by examiner

ENERGY ACCUMULATION AND DISTRIBUTION

FIELD OF THE INVENTION

Embodiments presented herein relate generally relate to energy accumulation and distribution. In particular the enclosed embodiments relate to an energy accumulation and distribution system and a corresponding method.

BACKGROUND OF THE INVENTION

In isolated energy systems, such as, but not limited to, offshore platforms and vessels, intense power consumption processes, such as drilling processes, use large amounts of energy to operate e.g., drilling rigs and heave compensation systems. Significant amounts of electrical energy may be generated by electric dynamic braking (so-called regenerative brakes). Braking resistors may in the electrical system be used to burn off surplus energy in e.g. DC links for variable speed drive systems. This energy is in offshore platforms and vessels dumped through air or water cooling systems (such as seawater or air cooled braking resistors).

Further, isolated energy systems, such as modern drilling rigs and drilling platforms, designed for cold climates consume large amounts of heat for de-icing, general utilities and heating, ventilation and air conditioning (HVAC) systems. This heat is traditionally mainly generated by oil-fired steam generators, steam boilers, or hot water boilers.

In existing offshore platforms and vessels the energy consumption system is not related to the energy generation system. Thus any mutual benefits from these systems are lost.

WO2011148050 discloses a rock drilling rig, a method for transfer drive of the rock drilling rig, and a speed controller. It is noted that surplus electric energy generated in deceleration may be converted to thermal energy in electric brake resistors. In addition to this, by means of the surplus electric energy produced in deceleration it is possible to operate one or more hydraulic systems in the rock drilling rig, whereby all the surplus electric energy need not just be wasted through brake resistors.

US 2010/133031 A1 relates to a hydraulic hybrid power system for a hydraulic hybrid vehicle where a pump is driven by one or more wheels of a hydraulic hybrid vehicle during braking. According to paragraph 7, when additional power is required by the vehicle, the liquid is released into a heat exchanger that transfers heat from the exhaust gas of the heat engine to the liquid causing at least a portion of the liquid to become gaseous.

However there is still a need to provide improved energy accumulation and distribution.

SUMMARY OF THE INVENTION

An object of embodiments herein is to provide improved energy accumulation and distribution.

The inventors of the enclosed embodiments have come to the insight that in isolated energy systems it could be beneficial to relate the energy consumption system to the energy generation system.

A particular object is therefore to provide improved energy accumulation and distribution based on an integrated energy consumption and generation system.

According to the present invention there may be provided a simple and robust system for accumulation and utilization of waste energy from power generation and electric dynamic braking energy, such as from motor braking on board offshore rigs and vessels. Particularly, according to a first aspect there is presented an energy accumulation and distribution system. The energy accumulation and distribution system comprises an energy accumulation and distribution system. The energy accumulation and distribution system comprises an energy accumulator for accumulating waste energy. The energy accumulator comprises a first energy interface adapted for receiving first waste energy to be accumulated from a braking power reserve. The energy accumulator comprises a second energy interface adapted for receiving second waste energy to be accumulated from a power generation reserve. The energy accumulator comprises an energy store adapted for accumulating said received first and second waste energy. The energy accumulator comprises a third energy interface adapted for providing the accumulated waste energy to at least one of an auxiliary energy exchanger and a main steam line so as to distribute the accumulated energy.

Advantageously the disclosed system thereby enables dumping of excess energy during periods when energy usage demands are lower than the energy produced.

Advantageously the disclosed system enables reduced $CO_2/NO_x$ emissions, better fuel economy, reduced operating costs, increased energy efficiency and cost savings related to capital expenditures for the energy accumulation and distribution system.

Further, the disclosed system enables simple and cost efficient installation; is not dependent on temperature limitations when using fresh water as cooling medium; provides increased operating flexibility and efficiency; and results in reduced wear and maintenance on diesel generators, etc.

According to embodiments the system may also be used to utilize spinning reserves (such as generators going on stand-by by regulations) to load the generator at a higher and more energy efficient level through the disclosed system.

According to embodiments the energy normally dumped through air or water cooling systems is utilized in secondary process systems as defined by the auxiliary energy exchanger.

The disclosed system may be part of a vessel or an offshore platform, such as an offshore oil rig. According to a second aspect there is thus presented a vessel comprising at least one energy accumulation and distribution system according to the first aspect. According to the second aspect there is also presented an offshore platform comprising at least one energy accumulation and distribution system according to the first aspect.

There is also provided a corresponding method, for example to be performed by an energy accumulation and distribution system in offshore platforms and vessels for energy accumulation and distribution, e.g., through hot water and steam. Braking resistors in the power system may produce the heat and the energy produced by the braking resistor may be used for other power consuming processes needed on the offshore platform/vessel. Particularly, according to a third aspect there is presented a method for energy accumulation and distribution. The method comprises controlling a first energy interface to receive first waste energy to be accumulated from a braking power reserve. The method comprises controlling a second energy interface to receive second waste energy to be accumulated from a power generation reserve. The method comprises controlling an energy store to accumulate said received first and second waste energy. The method comprises controlling a third energy interface to provide the accumulated waste energy to at least one of an auxiliary energy exchanger and a main steam line so as to distribute the accumulated energy.

According to a fourth aspect there is presented a computer program for energy accumulation and distribution. The computer program comprises computer program code which, when run on a controller, causes the controller to perform a method according to the third aspect.

According to a fifth aspect there is presented a computer program product comprising a computer program according to the third aspect and a computer readable means on which the computer program is stored.

It is to be noted that any feature of the first, second, third, fourth, and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description. The schematic diagrams presented in the drawings are not drawn to scale. For examples, although two lines may be crossing, this does not imply that the two lines are intersecting (i.e., joining) at such crossings. Elements not relevant to the inventive concept as presented herein are omitted for sake of clarity.

Offshore platforms and vessels are examples of isolated energy systems. Offshore platforms may typically be used for drilling, such as drilling for oil or gas. In general terms, drilling processes are considered to use large amounts of energy to operate the drilling and heave compensation systems.

Figure 1:
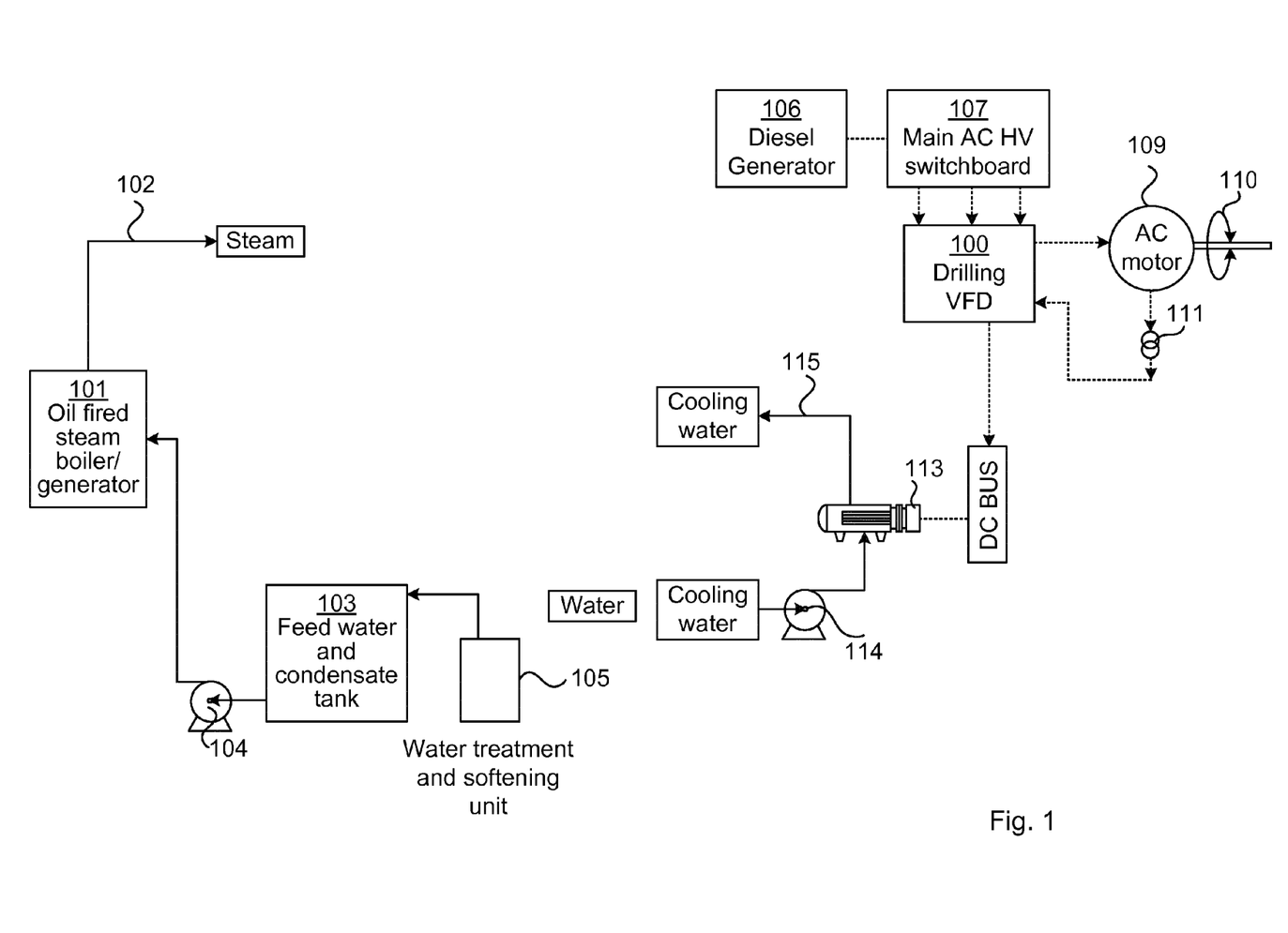
FIG. 1 is a schematic diagram illustrating separate energy systems according to prior art.

FIG. 1 illustrates an energy system according to the state of the art. The energy system illustrated in FIG. 1 may be representative of an isolated energy system, such as the energy system of an offshore platform or vessel. FIG. 1 illustrates a fully separate steam generation/heating medium loop and braking resistors. On the left-hand side fuel is burned so as to generate heat. In more detail, water is provided to a water treatment and softening unit 105. The treated water is then provided to a feed water and condensate tank 103. By means of a pump 104, water is then provided from the feed water and condensate tank 103 to an oil fired steam boiler/generator 101. Steam is then distributed to heat consumers through a main steam line 104. On the right-hand side heat is generated (when electrical power is consumed) and dumped into the ocean. In more detail, a main power generator 106 provides power to a main alternating current (AC) high voltage (HV) switchboard 107, the AC HV switchboard 107 providing power to a drilling variable frequency drive 108 (VFD). The VFD 108 controls a motor 9 for driving a drill 110. The VFD 108 also receives excess energy from the AC motor 109 when the motor is regenerating power. The excess energy is by the VFD 108 provided to a direct current (DC) bus 112 and further through the brake choppers to an electrical resistor 113 cooled by cooling water (as provided by a pump 114). The cooling water is the dissipated through a pipe 115 into seawater.

For example, the drill string is heavy and generally consumes large amounts of energy, in order to drive, lift, and/or lower the string. In addition, there are other electrical load systems that may require power, particularly in start-up phases. At offshore drilling systems, large diesel generators are typically used to provide electrical energy for the various loads. These are operated to secure additional available energy whenever it would be needed meaning that there can be generators running at no load or at other low utilization load conditions under which the generators are not efficient.

Energy consumption at modern drilling rigs and drilling platforms designed for cold climates is likely to increase, particularly the energy needed for heating used for de-icing, general utilities and HVAC systems. This heat is traditionally mainly generated by oil-fired steam generators, steam boilers or a waste heat recovery unit, which according to an embodiment is provided as a heat exchanger 228, placed adjacent the engines (such as a diesel generator, see below and FIG. 2).

In general terms, a composite drill string (hereinafter simply denoted drill string) comprises smaller individual strings having a certain length. A plurality of such individual strings is attached to each other to form the drill string. One by one the individual strings needs to be attached to the drill string placed in the drilling hole. The conventional way is to stop movement of the drill string when attaching the next length (i.e., the next individual string). Similarly, when pulling up the drill string up from the drilling hole the drill string needs to be stopped in order to allow each individual string to be detached/disassembled from the drill string. At the same time, electrical energy is generated by electric dynamic braking (regenerative brakes) of the drill string; both to stop it when entering the hole and to stop it when pulled up from the hole. Regenerative brakes are used on the drilling equipment (string) to slow or stop the equipment during drilling operations. Regenerative brakes may also be fitted to any heave compensation system on the platform or vessel which is used to compensate for and damp heaving (oscillation) of a load due to wave motion. The energy from hoisting or lowering the drill string or ramping down the speed of the rotating drill string is traditionally led to resistors cooled by either seawater or air. Significant amounts of electrical energy may thus traditionally be generated by electric dynamic braking (regenerative brakes). This energy is traditionally dumped via seawater- or air cooled braking resistors.

The herein disclosed embodiments relate to energy accumulation and distribution. For example, as noted above, energy from the rotating drill string is led to resistors cooled by either seawater or air. This means that this energy, which traditionally is not used at all, represents a clean energy source particularly useful for isolated energy systems with restricted access to energy. This energy may be harvested and utilized in secondary process systems comprising an energy storage and distribution. Such electrical power production from the brake system is however intermittent and dependent on uncontrollable factors such as wind and waves.

Figure 2:
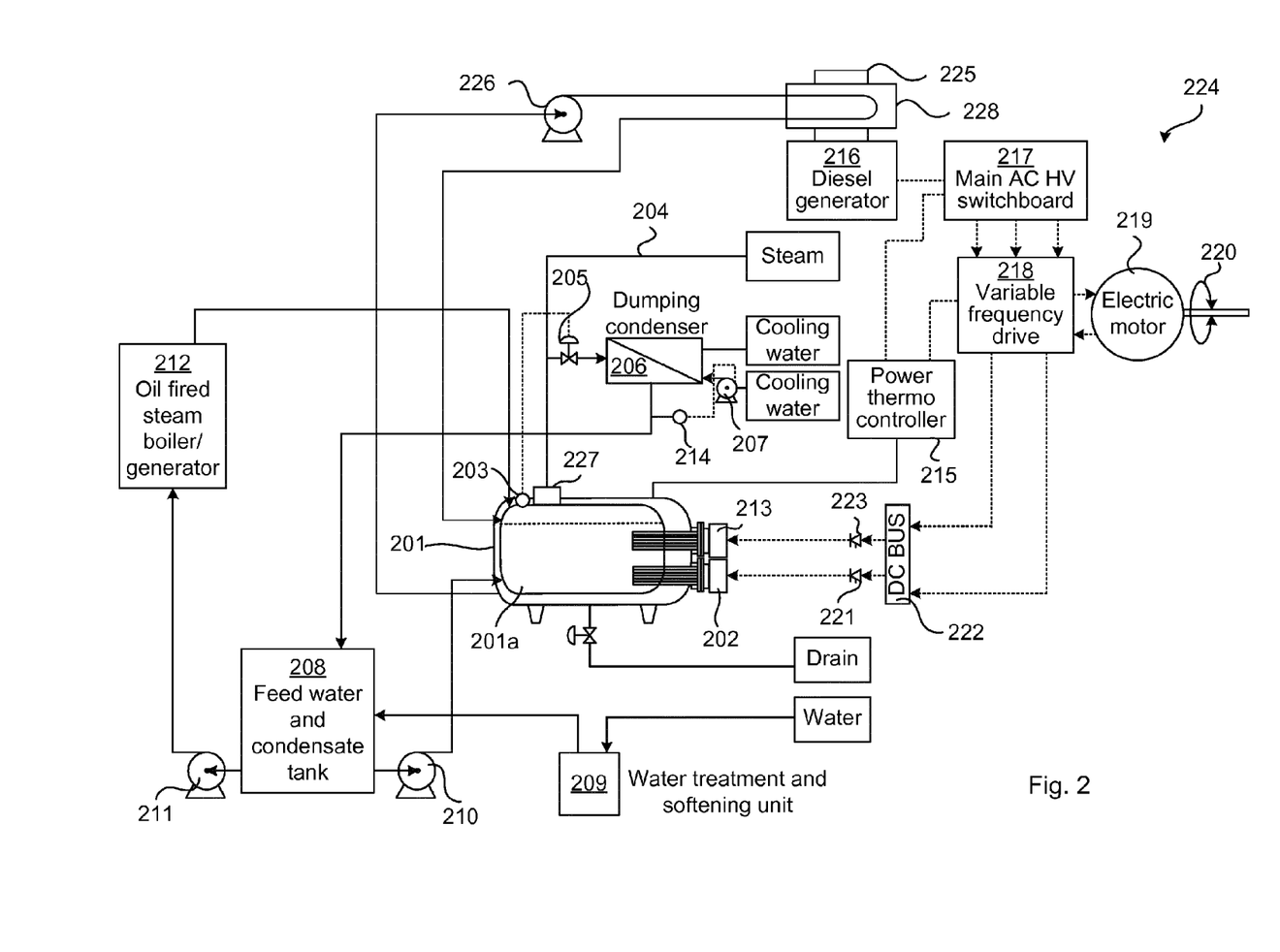
FIG. 2 is a schematic diagram illustrating an energy accumulation and distribution system where embodiments presented herein may be applied.

FIG. 2 is a schematic diagram illustrating an energy accumulation and distribution system 224 where embodiments presented herein may be applied. As will be further disclosed in detail below, the system illustrated in FIG. 2 is fully integrated where the bulk of the heating medium steam generation is performed with electrical power from regenerative brakes or from generators (spinning reserve, see below). For example, in periods of overproduction of steam a simple low cost dumping condenser may ensure safe and reliable dumping of any excess energy. In cases where the electrical energy delivered is insufficient a back-up oil fired steam generator may start and deliver the required steam to the accumulator.

In general terms, by implementing, for example, a large water volume in the form of a pressure vessel with integrated immersed resistance heaters, the energy from the regenerative brakes can be accumulated in a buffer storage for re-utilization in heat demanding processes on board the platform or vessel. In one scenario all the recovered energy can be utilized, thus saving significant amounts of fuel and thereby also reducing harmful emissions.

Figure 3:
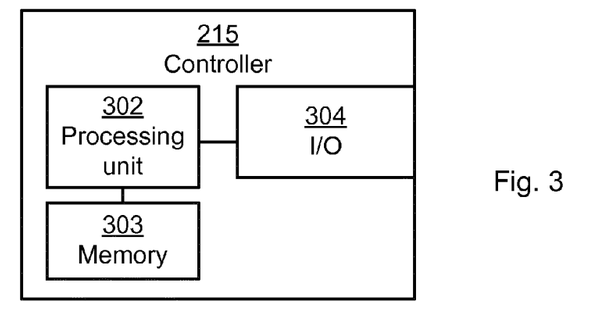
FIG. 3 is a schematic diagram showing functional modules of a controller.

FIG. 3 schematically illustrates, in terms of a number of functional modules, the components of a controller 215. A processing unit 302 is provided using any combination of one or more of a suitable central processing unit (CPU), multiprocessor, microcontroller, digital signal processor (DSP), application specific integrated circuit (ASIC) etc., capable of executing software instructions stored in a computer program product 401 (as in FIG. 4), e.g. in the form of a memory 303. Thus the processing unit 302 is thereby preferably arranged to execute methods as herein disclosed. The memory 303 may also comprise persistent storage, which, for example, can be any single one or combination of magnetic memory, optical memory, solid state memory or even remotely mounted memory. The controller 215 further comprises an input/output (I/O) interface 304 for communicating with other devices and entities in the energy accumulation and distribution system 224. The I/O interface 303 may further comprise a man-machine interface (MMI). The processing unit 302 controls the general operation of the controller 215, e.g. by sending control signals to the I/O interface 304 so as to control the other devices and entities in the energy accumulation and distribution system 224 and receiving reports from the I/O interface 304 relating to operation of the other devices and entities in the energy accumulation and distribution system 224. The communication between the controller 215 and the other devices and entities in the energy accumulation and distribution system 224 may occur either over a wired connection (fibre optics, copper wires, etc.) or over a wireless connection (radio, Bluetooth, etc.). Other components, as well as the related functionality, of the controller 215 are omitted in order not to obscure the concepts presented herein.

Figure 4:
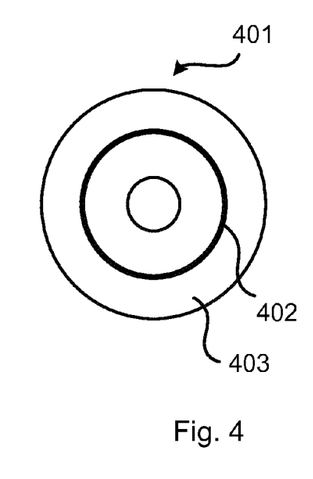
FIG. 4 shows one example of a computer program product comprising computer readable means.
Figure 5:
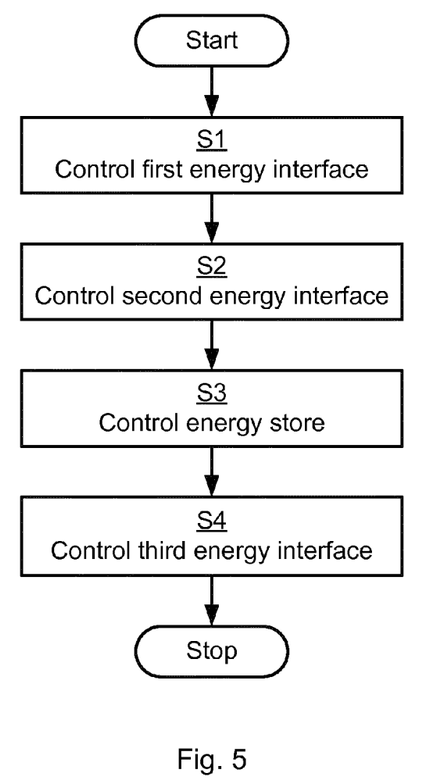
FIG. 5 is a flowchart of methods according to embodiments.

FIG. 5 is a flow chart illustrating embodiments of methods for energy accumulation and distribution. The methods are preferably performed by the controller 215. The methods are advantageously provided as computer programs 402. Functionality of the controller 215 associated with the methods for energy accumulation and distribution may thereby be downloaded, stored, installed and executed by the controller 215. FIG. 4 shows one example of a computer program product 401 comprising computer readable means 403. On this computer readable means 403, a computer program 402 can be stored, which computer program 402 can cause the processing unit 302 and thereto operatively coupled entities and devices, such as the memory 303 and the I/O interface 304 of the controller 215 to execute methods according to embodiments described herein. In the example of FIG. 4, the computer program product 401 is illustrated as an optical disc, such as a CD (compact disc) or a DVD (digital versatile disc) or a Blu-Ray disc. The computer program product 401 could also be embodied as a memory (RAM, ROM, EPROM, EEPROM, SD cards, network drives, etc.) and more particularly as a non-volatile storage medium of a device in an external memory such as a USB (Universal Serial Bus) memory. Thus, while the computer program 402 is here schematically shown as a track on the depicted optical disk, the computer program 402 can be stored in any way which is suitable for the computer program product 401.

Returning to FIG. 2, operation of the disclosed energy accumulation and distribution system 224 will now be described in more detail.

According to embodiments an electrical steam boiler is implemented in the form of a large steam drum downstream the electrical consumers (regenerative brakes and spinning reserve). Particularly, the energy accumulation and distribution system 224 comprises an energy accumulator 201 for accumulating waste energy.

The energy accumulator 201 comprises an energy store 201a adapted for accumulating said received first and second waste energy. According to an embodiment the energy store 201a is a fluid storage, such as a steam accumulator drum. The energy store 201a may additionally or alternatively be arranged to accumulating other types of fluids, such as oil or water.

The energy accumulator 201 further comprises energy interfaces for receiving and distributing energy. Particularly, the energy accumulator 201 comprises a first energy interface 202 adapted for receiving first waste energy to be accumulated from a braking power reserve. A method for energy accumulation and distribution thus comprises, in a step S1, controlling the first energy interface 202 to receive a first waste energy to be accumulated from a braking power reserve. The energy accumulator 201 further comprises a second energy interface 213 adapted for receiving a second waste energy to be accumulated from a power generation reserve. A method for energy accumulation and distribution thus comprises, in a step S2, controlling a second energy interface 213 to receive second waste energy to be accumulated from a power generation reserve. A method for energy accumulation and distribution further comprises, in a step S3, controlling the energy store 201a to accumulate the received first and second waste energy. The energy accumulator 201 further comprises a third energy interface 227 adapted for providing the accumulated waste energy to an auxiliary energy exchanger 206 so as to distribute the accumulated energy. A method for energy accumulation and distribution thus comprises, in a step S4, controlling the third energy interface 227 to provide the accumulated waste energy to at least one of the auxiliary energy exchanger 206 and a main steam line 204 so as to distribute the accumulated energy.

According to an embodiment the system 224 further comprises a pressure transmitter 203. The pressure transmitter 203 operatively connected to the energy accumulator 201. According to an embodiment the energy accumulator 201 is connected to the auxiliary energy exchanger 206. All excess electrical power may thereby be converted to steam pressure and be utilized in all processes that require heat.

Steam may thus be generated in an oversized steam drum as embodied by the energy store 201a. In general terms, the operating set-pressure of the energy store 201a may be higher than the system pressure to ensure (a) that electrical energy is given first priority and (b) that the system allows for a larger amount of energy to be accumulated for temporary storage.

If too much energy is delivered to the energy accumulator 201 at either first energy interface 202 (such as from braking power) or at the second energy interface 213 (such as from spinning reserve power) so that all excess energy cannot be distributed to the main steam line 204 a control valve 205 may open at a given set-pressure from the third energy interface 227 and release excess energy to the auxiliary energy exchanger 206. That is, according to an embodiment the energy accumulation and distribution system 224 further comprises a control valve 205. The control valve 205 is operatively connected to the pressure transmitter 203 and adapted for, at a predetermined set-pressure from the pressure transmitter 203, opening and releasing the accumulated waste energy to the auxiliary energy exchanger 206. The auxiliary heat exchanger 206 may thus be used only for dumping excess energy in cases of overproduction (and hence its name), i.e., in situations where all excess energy cannot be distributed to the main steam line 204. In all other cases the energy may be distributed through the main steam line 204. A method for energy accumulation and distribution may further comprises, in a step S9, controlling the control valve 205 to perform these actions.

According to an embodiment the auxiliary energy exchanger 206 is a heat exchanger or dumping condenser. The heat exchanger or dumping condenser may be a water cooled two phase heat exchanger or dumping condenser.

Cooling water for the cold side of the auxiliary energy exchanger 206 may be supplied by a sea-water circulation pump 207. The cooling water flow-rate may be controlled by a temperature transmitter 214 located in the return condensate line from the auxiliary energy exchanger 206 that gives a signal to the pump variable frequency drive (VFD) motor, which is further explained below. The auxiliary energy exchanger 206 (for example provided as a heat exchanger or dumping condenser) may be the only construction element that requires to be designed and constructed to resist corrosive effects of sea water.

If the steam pressure of the energy accumulator 201 drops below a minimum system set-point it means that there is more energy consumption from heat consumers than the energy delivered e.g., from a regenerative brake resistor (as delivered at the first energy interface 202) and/or a spinning reserve resistor (as delivered at the second energy interface 213). For example, the electrical production from a brake system may be intermittent and reliant on uncontrollable factors like wind and waves. To ensure full reliability a separate oil (or diesel) fired steam generator 212 may be connected to the energy accumulator 201. This steam generator 212 may start up and immediately deliver the required amount of steam pressure to the energy accumulator 201. The operating set-points may be controlled by the pressure transmitter 203 located and arranged to measure pressure of the energy store 201a. That is, according to an embodiment the energy accumulator 201 further comprises a fourth energy interface and the energy accumulation and distribution system further comprises a steam generator 212 operatively connected to the fourth energy interface arranged and adapted for deliver, at a predetermined level as provided by the pressure transmitter 203, a steam pressure to the energy accumulator 201. A method for energy accumulation and distribution may further comprises, in a step S10, controlling the steam generator 212 to perform these actions.

The steam generator 212 may use the same feed water and condensate return tank 208 as the energy accumulator 201. The steam generator 212 may however use a dedicated feed water pump 211; in turn the energy accumulator 201 may also use a dedicated feed water pump 210. That is, according to an embodiment the energy accumulation and distribution system 224 further comprises a feed water and/or condensate return tank 208. The feed water and/or condensate return tank 208 is operatively connected to the steam generator 212 and the energy accumulator 201. The feed water and/or condensate return tank 208 is adapted for providing feed water to the steam generator 212 and the energy accumulator 201, respectively. A method for energy accumulation and distribution may further comprises, in a step S11, controlling the feed water and/or condensate return tank 208 to perform these actions. Fresh make up water may be pre-treated, demineralized and/or de-oxygenized in a water treatment and softening unit 209.

General operation of the energy accumulation and distribution system 224 along with alarms may be communicated to a controller 215 which may have the overall control functionality for power optimization system incorporated in the energy accumulation and distribution system 224. That is, according to an embodiment the energy accumulation and distribution system 224 further comprises a controller 215 adapted for power control of the energy accumulation and distribution system 224. Total control and operation of the energy accumulation and distribution system 224 may be performed by a higher level system or supervisory control system with necessary inputs from a local control panel.

A main power source 216, such as a diesel generator, is arranged to deliver power to a main high voltage (HV) switchboard 217. From the HV switch board 217 power may then be distributed to the VFD 218 and re-distributed to loads 219 such as electrical motors which may power mechanical processes 220 such as a torque mechanical process involving operation of a winch or a piston. That is, according to an embodiment the energy accumulation and distribution system 224 further comprises a variable frequency drive, VFD, 218. The VFD 218 is operatively connected between a bus 222 and the drilling system. The bus 222 may be a direct current (DC) bus. The VFD 218 is adapted for distributing power to the drilling system from the power source 216. The VFD 218 is further adapted for distributing the first waste energy and the second waste energy from the drilling system to the bus 222. A method for energy accumulation and distribution may further comprise, in a step S8, controlling the VFD 218 to perform these actions.

Hot exhaust gas from the main power source 216 may be passed through a heat exchanger 228. The heat exchanger 228 may comprise multiple hairpin type water filled tubes. This heat exchanger 228 thus functions as a waste heat recovery unit and may be arranged to circulate water from the bottom of the energy store 201a and to return a two-phase stream of water and at a location higher in the energy store 201a. Water is passed through the heat exchanger 228 by means of a circulation pump 225 provided on a line connecting the heat exchanger 228 to the energy accumulator 201.

The mechanical process may be cyclic and use the electrical motor as a braking unit when the process runs in reverse. When such braking occurs the motor may generate electrical power which is sent in return to the VFD 218 where it thus may be further distributed to the bus 222. That is, according to an embodiment the energy accumulation and distribution system 224 further comprises a bus 222 operatively connected to a first brake chopper 221 and a second brake chopper 223. The bus 222 is adapted for receiving the first waste energy and the second waste energy from a drilling system and for providing the first waste energy and the second waste energy to the first brake chopper 221 and the second brake chopper 223, respectively. Anti-parallel thyristor bridges are one example of an equivalent of brake choppers and may thus be used instead of the herein disclosed brake choppers. A method for energy accumulation and distribution may further comprise, in a step S7, controlling the bus 222 to perform these actions.

The voltage in the bus 222 may then rise and the power may be sent through the first brake chopper 221 to an electrical resistor immersed in the energy accumulator 201. That is, according to an embodiment the energy accumulation and distribution system 224 further comprises a first brake chopper 221 operatively connected to the first energy interface and adapted for providing the first waste energy from the braking power reserve. A method for energy accumulation and distribution may further comprises, in a step S5, controlling the first brake chopper 221 to provide the first waste energy from the braking power reserve.

The electrical resistor may then release the power to the water in the form of heat. The heat generated increases the steam production and the steam pressure in the energy accumulator 201 and steam is distributed to heat consumers through a main steam line 204. The main steam line 204 may thus represent at least part of a utility heating medium.

In order to improve, or even optimize, the operation of the energy accumulation and distribution system 224 and reduce, or completely remove, the demand and requirement for a spinning reserve on the power generator 216, power from the main switchboard 217 may be distributed to the VFD 218 and from there to the bus 222.

An electrical resistor at the second energy interface 213 may be controlled by the second brake chopper 223 (power valve) which allows close to instantaneous re-routing of the power from the resistor to an alternative consumer in the main power grid. According to an embodiment the energy accumulation and distribution system 224 thus comprises a second brake chopper 223 operatively connected to the second energy interface 213 and adapted for providing the second waste energy from the power generation reserve. A method for energy accumulation and distribution may further comprises, in a step S6, controlling the second brake chopper 223 to provide the second waste energy from the power generation reserve In general terms, a spinning reserve may be regarded as a backup solution to ensure that there is always power available for starting up motors in the power grid. This basically means that the generator will run below optimal efficiency and can cause consequential maintenance issues related to poor fuel combustion and overall inefficient operation. When including a spinning reserve larger generators, or in some cases additional generators, may be needed to cover the reserve requirements.

In addition to the above the herein disclosed energy accumulation and distribution system 224 also allows additional improvement, or even optimization, for example in the form of reduced spinning reserve from the main power generators. Traditionally the requirement is to have in the order of 30% spinning reserve on generators, which means that the generator is running below optimal (in the order of 70%) and without sufficient load to ensure best possible efficiency. This reserve load can be utilized in the energy accumulator 201 to enable full load on the generator and ensure immediate power for motor starters by re-routing the power when required. A best case scenario could allow installation of smaller or fewer generators, whilst still enabling potential fuel savings, emission reductions and reduced wear and tear on generators due to poor combustion.

The invention has mainly been described above with reference to a few embodiments. However, as is readily appreciated by a person skilled in the art, other embodiments than the ones disclosed above are equally possible within the scope of the invention, as defined by the appended patent claims. For example, although disclosed in the context of drilling, the herein disclosed energy accumulation and distribution system may be used for other sources for energy recovery and for better utilization of energy, such as to improve, or even optimize, the use of fuel generators (typically diesel generators). This may also be advantageously applied in oil and gas drilling sites onshore that are in remote locations, for example without a grid connection.

The invention claimed is:

1. An energy accumulation and distribution system, comprising:
    an energy accumulator for accumulating waste energy, the energy accumulator comprising:
        a first electrical device adapted for receiving first waste energy to be accumulated from a braking power reserve;
        a second electrical device adapted for receiving second waste energy to be accumulated from a power generation reserve;
        an energy store adapted for accumulating said received first and second waste energy; and
        a third energy interface adapted for providing the accumulated waste energy to at least one of an auxiliary energy exchanger and a main steam line so as to distribute the accumulated energy.

2. The energy accumulation and distribution system according to claim 1, wherein the energy store is a fluid storage, such as a steam accumulator drum.

3. The energy accumulation and distribution system according to claim 1, further comprising:
    a first brake chopper operatively connected to the first electrical device and adapted for providing the first waste energy from the braking power reserve.

4. The energy accumulation and distribution system according to claim 1, further comprising:
    a second brake chopper operatively connected to the second electrical device and adapted for providing the second waste energy from the power generation reserve.

5. The energy accumulation and distribution system according to claim 3, further comprising:
a bus operatively connected to the first brake chopper and the second brake chopper and adapted for receiving the first waste energy and the second waste energy from a drilling system and for providing the first waste energy and the second waste energy to the first brake chopper and the second brake chopper, respectively.

6. The energy accumulation and distribution system according to claim 5, further comprising:
a variable frequency drive, VFD, operatively connected between the bus and the drilling system and adapted for distributing power to the drilling system from a power source and for distributing the first waste energy and the second waste energy from the drilling system to the bus.

7. The energy accumulation and distribution system according to claim 1, further comprising a pressure transmitter operatively connected to the energy accumulator.

8. The energy accumulation and distribution system according to claim 7, further comprising:
a control valve operatively connected to the pressure transmitter and adapted for, at a predetermined set-pressure from the pressure transmitter, opening and releasing the accumulated waste energy to the auxiliary energy exchanger.

9. The energy accumulation and distribution system according to claim 1, wherein the auxiliary energy exchanger is a heat exchanger or a dumping condenser.

10. The energy accumulation and distribution system according to claim 9, wherein the heat exchanger or dumping condenser is a water cooled two phase heat exchanger or dumping condenser.

11. The energy accumulation and distribution system according to claim 1, wherein the energy accumulator further comprises a fourth energy interface; the energy accumulation and distribution system further comprising: a steam generator operatively connected to the fourth energy interface arranged and adapted for deliver, at a predetermined level as provided by a pressure transmitter, a steam pressure to the energy accumulator.

12. The energy accumulation and distribution system according to claim 11, further comprising:
a feed water and/or condensate return tank operatively connected to the steam generator and the energy accumulator and adapted for providing feed water to the steam generator and the energy accumulator, respectively.

13. The energy accumulation and distribution system according to claim 1, further comprising:
a controller adapted for controlling the energy accumulation and distribution system.

14. A vessel comprising an energy accumulation and distribution system including:
an energy accumulator for accumulating waste energy, the energy accumulator comprising:
a first electrical device adapted for receiving first waste energy to be accumulated from a braking power reserve;
a second electrical device adapted for receiving second waste energy to be accumulated from a power generation reserve;
an energy store adapted for accumulating said received first and second waste energy; and
a third energy interface adapted for providing the accumulated waste energy to at least one of are auxiliary energy and a main steam line so as to distribute the accumulated energy.

15. A method for energy accumulation and distribution, the method comprising:
controlling a first electrical device to receive first waste energy to be accumulated from a braking power reserve;
controlling a second electrical device to receive second waste energy to be accumulated from a power generation reserve;
controlling an energy store to accumulate said received first and second waste energy; and
controlling a third energy interface to provide the accumulated waste energy to at least one of an auxiliary energy exchanger and a main steam line so as to distribute the accumulated energy.

* * * * *

UNITED STATES PATENT AND TRADEMARK OFFICE
CERTIFICATE OF CORRECTION

PATENT NO. : 9,528,697 B2  
APPLICATION NO. : 14/888760  
DATED : December 27, 2016  
INVENTOR(S) : Björn Sonnervig et al.

Page 1 of 1

It is certified that error appears in the above-identified patent and that said Letters Patent is hereby corrected as shown below:

On the Title Page

Column 1, (*) Notice, delete:

"Subject to any disclaimer, the term of this
patent is extended or adjusted under 35
U.S.C. 154(b) by 0 days.
This patent is subject to a terminal disclaimer."

Signed and Sealed this
Twenty-eighth Day of February, 2017

Michelle K. Lee
*Director of the United States Patent and Trademark Office*